UNITED STATES PATENT OFFICE.

LAWRENCE A. SMITH, OF PORT GIBSON, MISSISSIPPI.

FLAVORING COMPOUND FOR CIGARS.

1,202,442.          Specification of Letters Patent.      Patented Oct. 24, 1916.

No Drawing.      Application filed July 14, 1914. Serial No. 850,966.

*To all whom it may concern:*

Be it known that I, LAWRENCE A. SMITH, a citizen of the United States, and a resident of Port Gibson, in the county of Claiborne and State of Mississippi, have invented a new and useful Improvement in Flavoring Compounds for Cigars, of which the following is a specification.

My invention is an improvement in formula for liquids for flavoring cigars, and has for its object to provide a liquid of the character specified, for use in the device forming the subject-matter of my co-pending application, Serial No. 850,939, filed July 14, 1914.

The improved liquid is designed to be placed under pressure in containers, normally closed, and having valve mechanism, which may be operated by pressing down over the port through which the liquid is expelled under pressure with the clipped end of the cigar. When the valve is opened in this manner a portion of the liquid in the form of spray or in suspension is drawn into the cigar, thus moistening and flavoring the same.

The liquid is composed of fluid extract of Havana tobacco or other high grade tobacco of excellent quality to which sufficient alcohol is added to preserve the fluid extract and to prevent deterioration.

The above is the base of the liquid, and preferably the liquid is suitably flavored by any desired flavor suitable for the purposes. The liquid may be flavored with Jamaica rum, Bourbon whisky or wine, or practically any flavoring that attracts.

In practical use, a number of containers are provided, containing different flavors in order that all may be satisfied.

I claim:—

1. A compound for flavoring cigars and the like to be injected into the cigar in the form of a nebula or spray, and comprising a fluid extract of a high grade tobacco, as Havana, and a volatile essence, in an alcoholic solution.

2. A compound for flavoring cigars or the like, to be injected into the cigar in the form of a nebula or spray, and comprising a fluid extract of a high grade tobacco in an alcoholic solution.

LAWRENCE A. SMITH.

Witnesses:
C. E. TRAINOR,
C. M. FORREST.

Copies of this patent may be obtained for five cents each, by addressing the "Commissioner of Patents, Washington, D. C."